(12) United States Patent
Rosso

(10) Patent No.: US 6,231,899 B1
(45) Date of Patent: May 15, 2001

(54) CREAM FILLED WAFER PRODUCT

(75) Inventor: Renato Rosso, Alba (IT)

(73) Assignee: Soremartec S.A. (BE)

( * ) Notice: Subject to any disclaimer, the term of this patent is extended or adjusted under 35 U.S.C. 154(b) by 0 days.

(21) Appl. No.: 09/539,217

(22) Filed: Mar. 30, 2000

(30) Foreign Application Priority Data

Apr. 2, 1999 (EP) ................................................. 99830192

(51) Int. Cl.[7] .................................................... A23G 3/00
(52) U.S. Cl. ........................... 426/94; 426/138; 426/306; 426/309; 426/660
(58) Field of Search ............................ 426/93, 94, 138, 426/549, 660, 306, 309

(56) References Cited

U.S. PATENT DOCUMENTS

| | | | |
|---|---|---|---|
| 809,100 | * | 1/1906 | Diener ................................. 426/94 |
| 4,889,729 | * | 12/1989 | Aujourd'Hui ......................... 426/94 |
| 4,963,379 | * | 10/1990 | Ferrero ............................. 426/94 X |
| 6,024,995 | * | 2/2000 | Rosso ................................. 426/93 |
| 6,103,279 | * | 8/2000 | Ferrero ............................ 426/138 X |

FOREIGN PATENT DOCUMENTS

| | | | |
|---|---|---|---|
| 0054229 | * | 6/1982 | (EP) . |
| 0086319 | * | 8/1983 | (EP) . |
| 083324 | | 4/1988 | (EP) . |
| 0614614 | * | 9/1994 | (EP) . |
| 064155 | | 9/1995 | (EP) . |
| 768254 | | 4/1997 | (EP) . |
| 96/28035 | | 9/1996 | (WO) . |
| 041546 | | 12/1997 | (WO) . |
| 97/48282 | | 12/1997 | (WO) . |
| 98/47388 | | 10/1998 | (WO) . |

\* cited by examiner

*Primary Examiner*—Milton Cano
(74) *Attorney, Agent, or Firm*—Rothwell, Figg, Ernst & Manbeck

(57) ABSTRACT

A wafer product comprises a wafer shell comprising at least two wafer half-shells coupled together face to face. This shell contains a filling of a substantially hydrated mass which includes a soft toffee core and is covered substantially by a coating which covers the wafer shell on the side opposite the filling. The product also includes at least one praline which comprises a casing of firm material, such as chocolate, enclosing a respective filling.

10 Claims, 1 Drawing Sheet

CREAM FILLED WAFER PRODUCT

Figure 1:
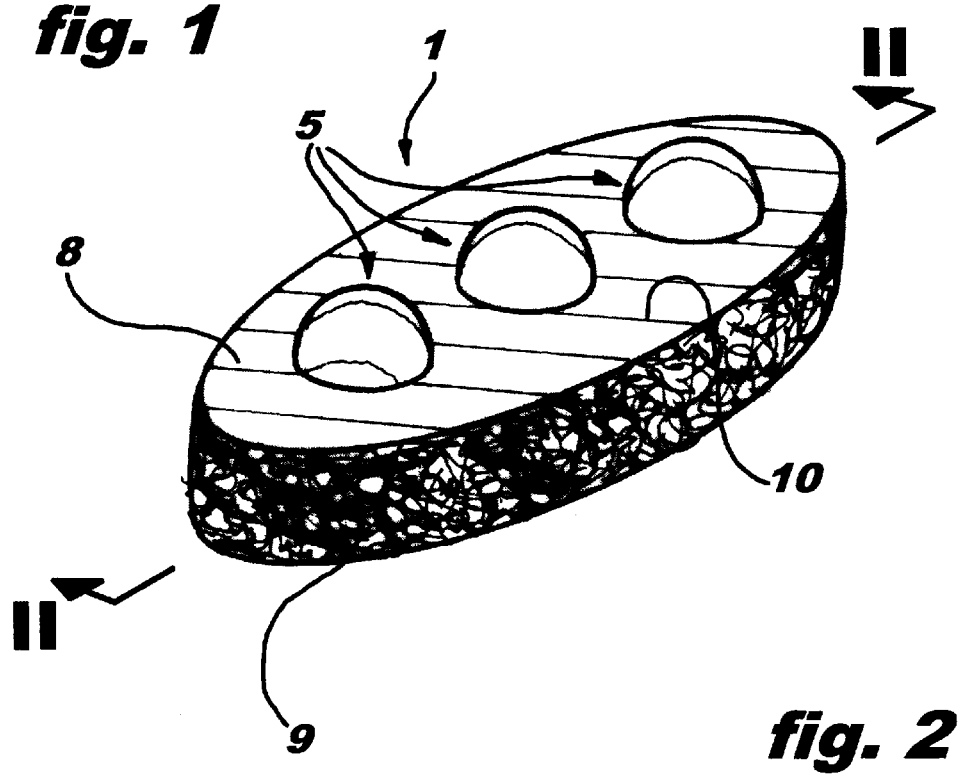

The present invention relates to a food product structure with a wafer shell and a moist creamy filling.

Products of the type mentioned above are known in the art, as demonstrated, for example, by the documents EP-A-0 064 155, EP-A-0 083 324 and WO-A-96/28035.

In particular, this last document, after which the preamble of Claim 1 was patterned, describes a semi-cold product which includes a casing formed by two wafer half-shells enclosing a mass of hydrated, or substantially hydrated, creamy filling. A soft toffee core is buried in the mass of filling and the wafer casing is preferably entirely coated, in a layer of chocolate-based coating for example, possibly with the total or partial addition of chopped nuts and other items or other chopped items.

When manufacturing this type of product, it is necessary to take into account the intrinsic criticality of the combined use of a layer of wafer with a hydrated mass (or a substantially hydrated mass, that is liable to have a certain moisture content). The arrangement described in the last cited international Patent Application tackles and solves the problem caused by the fact that the intrinsic moisture of the filling mass tends to seep towards the wafer shell, leading to such negative phenomena as softening, mould, fermentation processes and the like. In particular, this result is achieved while placing the hydrated creamy filling (constituted, for example, by a milk-based cream) in direct contact with the wafer shell. This is achieved without providing any intermediate insulating layer, but by providing, instead, a soft toffee (mou) core in the filling mass, and formulating the constituent wafer, filling and soft toffee in such a way that controlled movement of moisture takes place between the three items, thereby ensuring the desired structural consistency in the finished product. This result is further improved by ensuring that the wafer shell forms a closed casing around the filling mass in which the soft toffee is embedded, and by entirely covering the outer surface of the said shell with a coating mass (enrobing) of a material (typically chocolate), possibly with the addition of chopped nuts.

It is also important, when manufacturing such products, to prevent the wafer component from playing too great a part in the final organoleptic profile of the product. In view of the aforementioned application, the arrangement described in WO-A-97/48282 aims to produce items having a very thin wafer with a shaped section (which makes it possible to manufacture a closed casing surrounding the mass of filling).

The object of the present invention is to improve further the arrangements described above, in particular with regard to the possibility of increasing the presence in the product of creamy, paste-like or even liquid components, with the additional possibility of differentiating—if this is seen as useful or advantageous—between the organoleptic properties of these components.

According to the invention, this object is achieved by providing a food product structure having the additional characteristics described in the Claims which follow.

Figure 2:
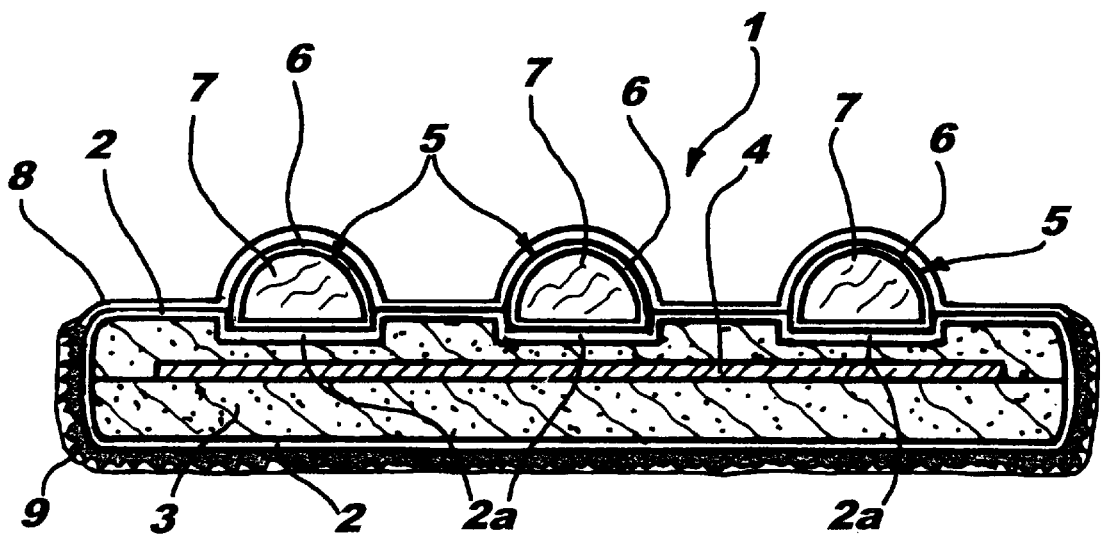

The invention will now be described, purely by way of non-limitative example, with reference to the appended drawings, in which:

FIG. 1 is an overall view of a product in which the structure of the invention finds application, and FIG. 2 is a cross section taken on the line II—II of FIG. 1.

In the appended drawings, the reference number 1 generally indicates a food product such as a semi-cold confectionery product. In one possible embodiment, the product 1 is approximately the shape of a flattened bar which is lens-shaped with rounded ends. While preferred, this shape, which is the subject of the international ornamental model DM/041546 is in no way compulsory or binding on the embodiments of the invention.

The overall shape of the product 1 is essentially dictated by the shape of a wafer shell constituted by two tray-like half-shells 2, the openings of which are complementary. The two half-shells 2 can thus be coupled face to face so as to form together a closed casing.

In particular, it will be appreciated that one of the half-shells 2 (in particular the one which is intended to form the upper surface of the product 1) has a plurality of sunken formations 2a in its substantially flat base wall (three in the embodiment illustrated by way of example). The formations 2a extend towards the inner cavity of the half-shell 2 so as to form three tray-like cavities opening to the outer surface of the half-shell 2. The reasons for the presence of the said cavities 2a will become apparent later in this description.

In the currently preferred embodiment of the invention, the technique for manufacturing the half-shells 2 is that forming the subject of the already cited application WO-A-97/48282.

The internal volume of the product 1, defined by two wafer half-shells 2, receives a filling 3 of a hydrated creamy mass. This can be, for example, a milk-based custard according to a formulation of the type described in WO-A-96/28035. The filling is thus substantially hydrated, with a moisture level of around 25–30% of its weight, that is a far greater moisture level than that characteristic of the wafer half-shells (typically around 3–6% of their weight or less).

Inside the mass of hydrated filling 3 is a core 4 constituted by a bar or slice of the product currently known as a "mou" (soft toffee): this is a well known food mass made of a mixture of caramel and condensed milk, possibly with the addition of nut paste, vegetable fat, dairy butter and flavouring.

The casing of the product, constituted by the two wafer half-shells 2, coupled together face to face (after, of course, being filled with the filling mass 3 containing the core 4 of soft toffee), is further enriched by placing praline 5 in the corresponding cavities 2a. In the exemplary embodiment illustrated, each praline 5 is constituted by a shell 6 (typically hemispherical) closed at its equatorial base wall, of a firm, solid material, such as chocolate or a material similar to chocolate, filled with a respective creamy filling 7, for example a nut, coffee or mint-flavoured cream, or the like.

Each praline 5, usually constituted by a shell made of low-melting chocolate, thus forms a sort of "taste container", enabling the product 1—and its non-wafer component in particular—to be enriched with paste-like/creamy elements, or even liquids. The casing 6 is in fact able to contain a liquid filling, for example an alcoholic or non-alcoholic syrup, in addition or as an alternative to a creamy or paste-like mass as previously stated.

It is clear from the above that the product 1 can be further enriched, from an organoleptic point of view, an advantage which is especially significant in view of the preferably semi-cold characteristics of the product.

In addition, the presence of several pralines enables the product to be differentiated by the organoleptic characteristics of the pralines: different fillings 7 could be made available, for example, differing both by taste and by consistency (paste-like/creamy or liquid).

It is clear that in order to combine the pralines 5 with the basic structure of the product (constituted by the half-shells 2, the filling 3 and the core 4) it is not necessary to form the cavities 2a in one of the half-shells 2 at the time the latter are manufactured. However, the presence of those cavities, for at least partial reception is advantageous since it enables the pralines 5 to be carefully and accurately positioned, arranged on one of the opposite surfaces of the wafer shell, which is generally flat.

The above is especially significant in view of the fact that the assembly of components described so far is preferably covered in a layer 8, constituted, according to a preferred embodiment of the invention, by a continuous coating, which covers, without joins, the entire outer surface of the half-shells 2 (and usually the pralines 5, the casing 7 of which is arranged in contact with a respective wafer half-shell 2). The coating is preferably chocolate or a similar product. In one arrangement, which has proved particularly advantageous, the coating layer 8 forms a double layer 9—at least over part of the product 1.

To this end, the product is usually coated first to its upper edge (excluding the surface on which the pralines 5 are arranged). Chopped nuts are then applied and adhere to the coating. The entire product is then covered in a second layer of chocolate, one function of which is to cover the chopped nuts entirely in the area of the double coating 9.

The assembly thus achieved can be finished to advantage with a generally striped pattern 10 on its upper surface (pralines as well), formed for example by piped chocolate.

The manufacture of the product 1 of the invention involves a sequence of operating steps which are well known in the art.

Comments in WO-A-96/28035 are applicable in particular to the manufacture of the basic structure (half-shells 2 enclosing the mass of filling 3 and the bar or slip of mou 4). The arrangement of the pralines 5 in the cavities 2a is a typical manipulation operation, which is suited to being carried out, for example, by a suction lifter commonly used in the food industry (see, for reference, EP-A-0 768 254 and the documents cited therein). The pralines can be manufactured, advantageously, by using the method currently used to make the chocolate pralines marketed under the trade mark Pocket Coffee by companies of the Ferrero group, a method which involves applying a protective sugar coating to the inner surface of the chocolate shell. Finally, the advice provided in WO-A-98/47388 may usefully be referred to for the application of the coating 8, 9 (in view, in particular of the differentiated character of the lower portion 9 of the product).

Naturally, the principle of the invention remaining the same, manufacturing details and embodiments may be widely varied from those described and illustrated, without departing thereby from the scope of the invention, as defined in the appended Claims.

What is claimed is:

1. A food product structure comprising a wafer shell comprising at least two wafer half-shells coupled to each other face to face, said shell containing a filling of a substantially hydrated mass which includes a soft toffee core and is substantially covered by a coating which covers said wafer shell on the other side from said filling, wherein it also includes at least one praline which comprises a casing of firm material enclosing a respective filling.

2. A structure according to claim 1, wherein the casing of said at least one praline is chocolate.

3. A structure according to claim 1, wherein the filling of said praline is selected from the group consisting of a creamy material, a paste and a liquid material.

4. A structure according to claim 1, including a plurality of said pralines.

5. A structure according to claim 4, wherein the pralines of said plurality contain respective fillings which differ from each other.

6. A structure according to claim 1, wherein at least one of said half-shells has at least one shaped portion defining an, at least partial, reception cavity for a said at least one praline.

7. A structure according to claim 1, wherein said at least one praline is arranged with the respective casing thereof in contact with one of said wafer half-shells and in that said coating extends to cover said praline.

8. A structure according to claim 1, said structure having a generally flat shape with two opposite faces, said at least one praline being arranged on one of said faces.

9. A structure according to claim 8, wherein said coating has different characteristics on the face where said at least one praline is arranged and in the remaining portions of the structure itself.

10. A structure according to claim 9, wherein said coating includes, at the site of said remaining portions, a granular material dispersed in the coating itself.

* * * * *